2,771,411

CYANIDE COMPOSITIONS SUITABLE FOR ELECTROPLATING BATHS AND METHOD FOR THE PREPARATION THEREOF

Allan E. Chester, Highland Park, Ill., and Joseph T. Irwin, Lakewood, Ohio, assignors to Poor & Company, Chicago, Ill., a corporation of Delaware No Drawing. Application May 10, 1951,
Serial No. 225,671

9 Claims. (Cl. 204—46)

This invention relates to cyanide compositions derived from by-product aqueous cyanide solutions containing organic contaminants and to a method of treating such compositions to provide new and useful compositions suitable for employment in cyanide electroplating baths.

The term "by-product cyanide aqueous solution containing organic contaminants" is employed herein to describe an aqueous solution of a cyanide derived from coke oven gases by absorption of such gases in an aqueous solution of an alkali, as for example, sodium, potassium and/or ammonium hydroxides. A typical by-product cyanide composition derived by the absorption of coke oven gases in sodium hydroxide by the Kopper's process has the following composition by weight:

Sodium cyanide (NaCN) _____ 30 percent
Sodium hydroxide (NaOH) _____ 2 percent
Sulfide and organic sulfur contaminants _ 0.015 percent
Calculated as $Na_2S$, and the remainder water.

It will be understood that the sulfide and organic sulfur contaminants, although calculated as sodium sulfide in the foregoing typical composition, are primarily present with sulfur combined in the form of an organic compound. These organic contaminants cause colored deposits in cyanide plating baths, for example, cyanide baths of gold, silver, cadmium, zinc, and copper. The electrodeposited plate is stained and porous. The contaminants also cause interference with anode corrosion and, hence, their presence results in inefficient electrodeposition.

One of the objects of the present invention is to provide a method of treating by-product aqueous cyanide solutions containing organic contaminants to make them useful as electrolytes in cyanide plating baths.

Another object of the invention is to provide new and useful aqueous alkaline cyanide compositions derived from coke oven gases and substantially free from organic contaminants which interfere with the electrodeposition of metals from cyanide plating baths containing the plating metal in dissolved form. Other objects will appear hereinafter.

These objects are accomplished in accordance with this invention by subjecting a by-product cyanide aqueous alkaline solution containing organic contaminants in which sulfur is present in an organically combined form successively to treatment with (1) an oxidizing compound capable of liberating nascent oxygen in alkaline solutions, for example, hydrogen peroxide, sodium peroxide, benzoyl peroxide, sodium hypochlorite, manganese dioxide and/or potassium permanganate, and (2) activated carbon.

The resultant product is essentially an alkaline aqueous cyanide solution containing excess alkali which shows no test for sulfides when tested with lead acetate solution.

The desired product can be obtained by treating the by-product alkaline aqueous cyanide solution solely with activated carbon, but the amount of carbon required is relatively large and the time of treatment is too long for practical operations. It has been found that a certain amount of the undesired contaminants are alkali soluble organic compounds containing sulfur which are reacted upon by oxidizing agents that liberate nascent oxygen in alkaline aqueous solutions. By adding such oxidizing agents to the by-product alkaline aqueous cyanide solution initially it is possible to reduce the amount of activated carbon required to remove the residual organic contaminants and also to reduce the time of treatment.

In the practice of the invention the first step is preferably effected by treating the by-product alkaline aqueous cyanide solution with an oxidizing agent of the class described while heating to a temperature of about 140° F. to 200° F. with agitation. If the oxidizing agent is a metallic peroxide, the metal of which forms insoluble oxides in aqueous alkaline solutions, the metallic oxides formed are removed by subsequent filtration through an activated carbon filter cake as hereinafter described.

As will readily be understood by those skilled in the art, the quantity of oxidizing compound employed in the first step of the process is an excess over the amount required to react with the sulfur present in the by-product aqueous cyanide solution. For example, where the amount of sulfur, calculated as $Na_2S$, constitutes approximately 0.015% of the by-product cyanide material, we prefer to employ about two grams of manganese dioxide per gallon of the by-product cyanide material or the equivalent quantity of another oxidizing compound.

The treatment with activated carbon is effected by making a filter cake containing about 25% by weight of activated carbon and a non-siliceous filter aid, for example, paper pulp. The material derived from the first step of the process is passed through the filter cake. In order to treat approximately 100 gallons of this material in six passes, approximately six pounds of activated carbon are required.

The product produced in accordance with the invention is suitable for use in any alkaline cyanide electroplating bath, as for example in cyanide plating baths containing gold, silver, cadmium, zinc, and copper in the form of a bath soluble compound. The electrodeposited plates produced in such baths are free fom the objectionable stains and porosity which characterize plates produced in by-product cyanide aqueous solutions containing organic contaminants.

The invention is hereby claimed as follows:

1. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment with an oxidizing compound selected from the group consisting of peroxides, hypochlorites and permanganates to oxidize sulfurous substances, passing the resulting solution through a filter cake containing activated carbon, thereby removing detrimental substances from said by-product solution, providing a metal platable from an alkaline cyanide bath in the resulting purified by-product solution in a soluble form, and electroplating said metal from the resulting plating solution.

2. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment with an oxidizing compound selected from the group consisting of peroxides, hypochlorites and permanganates to oxidize sulfurous substances, passing the resulting solution through a filter cake containing activated carbon, thereby removing detrimental substances from said by-product solution, providing a metal selected from the group consisting of gold, silver, cadmium, zinc, and copper in the resulting purified by-product solution in a soluble form, and electroplating said metal from the resulting plating solution.

3. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment with an inorganic peroxide to oxidize sulfurous substances, passing the resulting solution through a filter cake containing activated carbon, thereby removing detrimental substances from said by-product solution, providing a metal selected from the group consisting of gold, silver, cadmium, zinc, and copper in the resulting purified by-product solution in a soluble form, and electroplating said metal from the resulting plating solution.

4. A method as defined in claim 3 wherein the inorganic peroxide is hydrogen peroxide.

5. A method as defined in claim 3 wherein the inorganic peroxide is sodium peroxide.

6. A method as defined in claim 3 wherein the inorganic peroxide is manganese dioxide.

7. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment at a temperature of about 140° F. to 200° F. with an oxidizing compound selected from the group consisting of peroxides, hypochlorites and permanganates to oxidize sulfurous substances, passing the resulting solution through a filter cake containing activated carbon, thereby removing detrimental substances from said by-product solution, providing a metal selected from the group consisting of gold, silver, cadmium, zinc, and copper in the resulting purified by-product solution in a soluble form, and electroplating said metal from the resulting plating solution.

8. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment at a temperature of about 140° F. to 200° F. with an inorganic peroxide to oxidize sulfurous substances, passing the resulting solution through a filter cake containing activated carbon thereby removing detrimental substances from said by-product solution, providing metal selected from the group consisting of gold, silver, cadmium, zinc, and copper in the resulting purified by-product solution in a soluble form, and electroplating said metal from the resulting plating solution.

9. A method for electroplating metal from a by-product aqueous alkaline cyanide solution derived by absorbing coke oven gases in an aqueous alkaline solution, to produce an electrodeposited plate free from stain and porosity, which comprises first adding manganese dioxide to such a by-product solution containing by weight about 30% of sodium cyanide, about 2% of sodium hydroxide, and about 0.015% of combined sulfur, calculated as $Na_2S$, heating the resulting mixture at a temperature of about 140° F. to 200° F. to oxidize sulfurous substances, passing the resulting product through a filter cake containing activated carbon, thereby removing detrimental substances from said by-product solution, providing a metal selected from the group consisting of gold, silver, cadmium, zinc, and copper in the resulting purified by-product solution in a soluble form, and electroplating said metal from the resulting plating solution.

References Cited in the file of this patent

UNITED STATES PATENTS

| Number | Name | Date |
|---|---|---|
| 1,323,239 | Basore | Dec. 2, 1919 |
| 1,806,370 | Sperr | May 19, 1931 |
| 2,000,134 | Harris | May 7, 1935 |
| 2,201,760 | Burrage | May 21, 1940 |
| 2,219,713 | Schreiber | Oct. 29, 1940 |
| 2,248,092 | Korpiun | July 8, 1941 |
| 2,440,837 | Webster | May 4, 1948 |

OTHER REFERENCES

Smith: Metal Industry, Nov. 10, 1939, pp. 415–417.
Diggin: American Electroplaters Monthly Review, May 1946, pp. 513–516.